Oct. 7, 1952 — W. E. LLEWELLYN — 2,612,724
AUTOMATIC TREE TRIMMER
Filed Feb. 19, 1949 — 2 SHEETS—SHEET 1
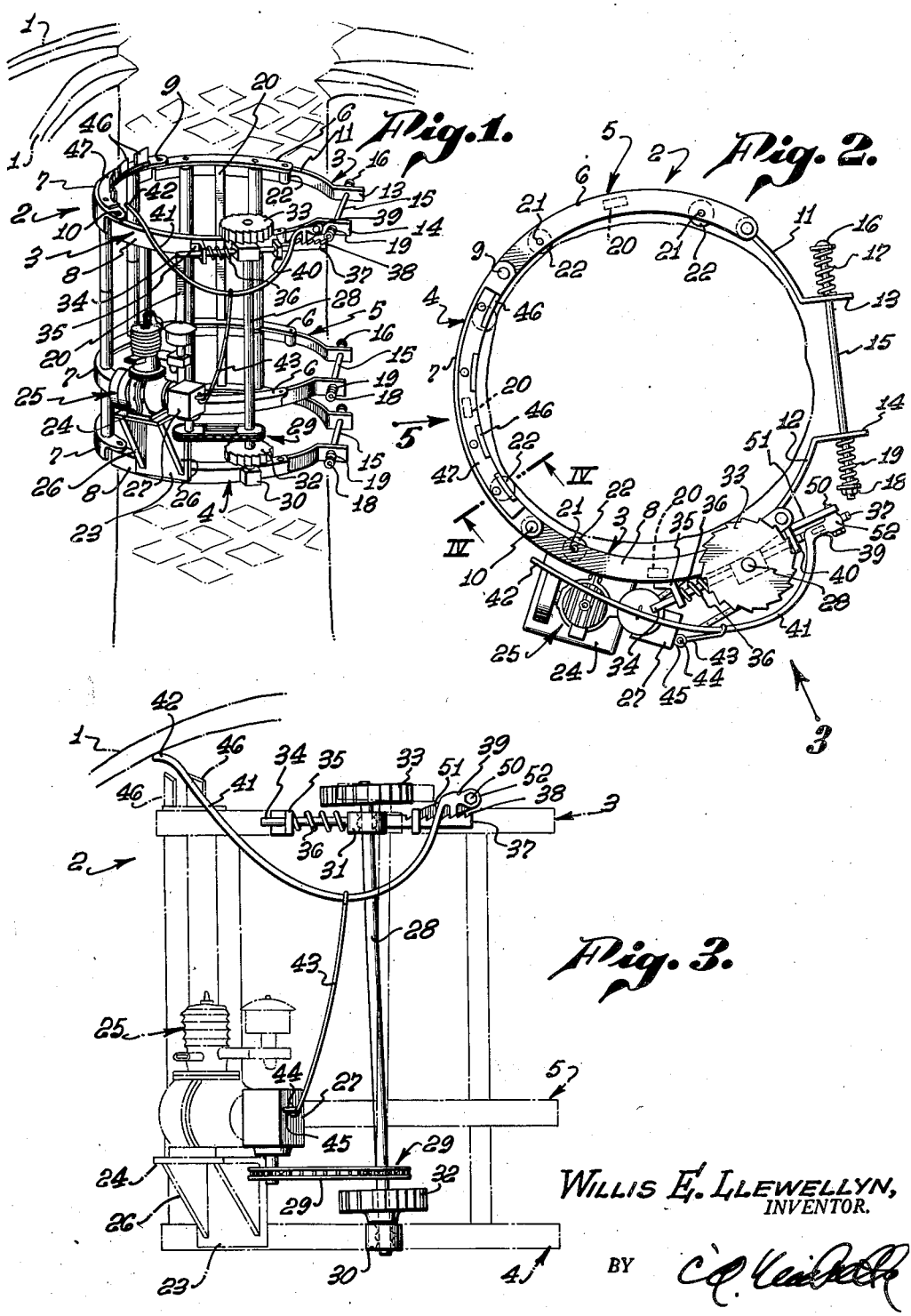
WILLIS E. LLEWELLYN, INVENTOR.
BY *[signature]*
ATTORNEY.

Oct. 7, 1952 — W. E. LLEWELLYN — 2,612,724
AUTOMATIC TREE TRIMMER
Filed Feb. 19, 1949 — 2 SHEETS—SHEET 2
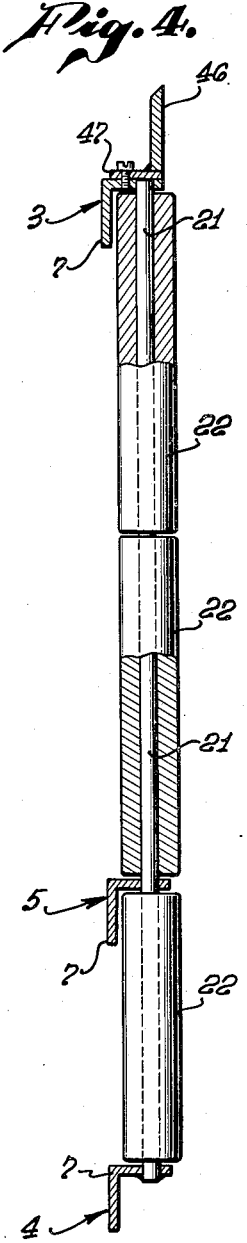
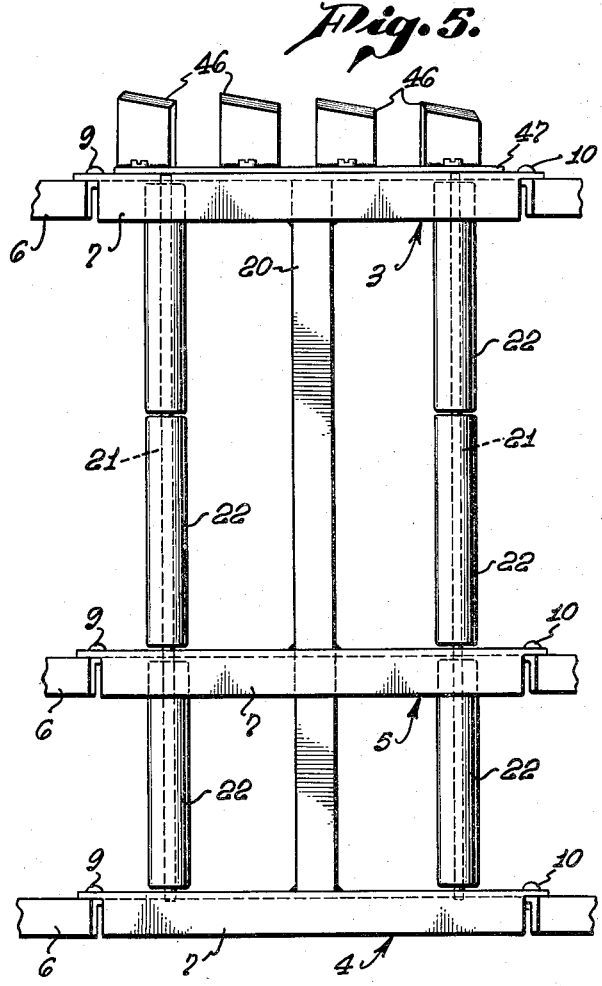
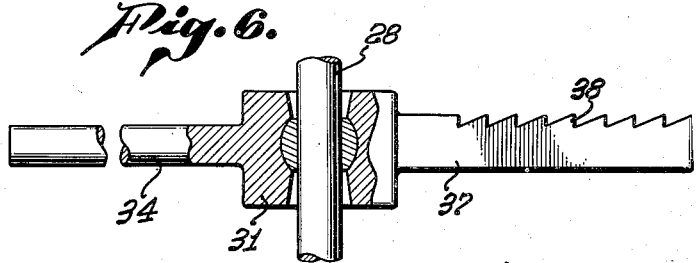
WILLIS E. LLEWELLYN,
INVENTOR.
BY
ATTORNEY.

Patented Oct. 7, 1952

2,612,724

UNITED STATES PATENT OFFICE 2,612,724

AUTOMATIC TREE TRIMMER

Willis E. Llewellyn, Compton, Calif.

Application February 19, 1949, Serial No. 77,314

12 Claims. (Cl. 47—1)

This invention relates to a palm tree trimming apparatus operable to ascend a palm tree while encircling the trunk thereof for cutting off downwardly turned palm leaves or palm fronds, stop at the point where the dead palm leaves end and then descend the tree, the entire operation being automatically and mechanically performed.

In the growth of certain types of palm trees, new leaves or palm fronds are grown which extend upwardly and outwardly from the tree trunk. As the tree ages, the leaves die and bent downwardly from a point adjacent the tree trunk so that they are virtually hanging vertically from the tree. Newly formed leaves which are upwardly directed are spaced above the old dead leaves and at this point there is a definite area or line of demarcation between the old and the new leaves. The dead downwardly hanging palm leaves give the tree a shaggy, unkempt, unattractive appearance which is very objectionable. In addition, the dead leaves become very dry creating a dangerous fire hazard.

Heretofore, it has been the practice to trim the dead palm leaves manually by climbing the tree trunk and cutting off the leaves by saws or knives. Such manual trimming is both difficult and dangerous because of the very tall heights to which palm trees may grow, and because it is awkward for the trimmer to reach through the downwardly turned leaves to the point where the leaf is attached to the trunk. Manual trimming is very expensive because it must be done slowly and carefully.

It is therefore, the primary object of this invention to provide and design a mechanical palm tree trimming apparatus capable of ascending a tree, removing the dead leaves and then descending without manual guidance or control.

Another object of this invention is to provide a palm tree trimming apparatus which will remove the palm leaves from the tree trunk in such a manner that a smooth relatively uninterrupted surface is left on the tree trunk.

Still another object of this invention is to provide a tree trimming apparatus wherein the apparatus is automatically expandable and contractible to adjust for various diameters of a tree trunk.

A further object of this invention is to provide an apparatus such as that described above wherein cutting elements are mounted for adjustably conforming to various diameters of a tree trunk.

Still another object of this invention is to provide a palm tree trimming apparatus wherein automatic means are provided for causing descent of the apparatus when it reaches the point on the tree trunk where new palm leaves are growing.

The palm tree trimming apparatus contemplated by this invention is of simple construction, inexpensive, and easy to manufacture; and each apparatus is readily adaptable to be employed on tree trunks of different sizes.

Other objects and advantages of this invention will be readily apparent from the following description of the drawings and the appended claims.

In the drawings:

Fig. 1 is a perspective view of a palm tree trimming apparatus embodying this invention, the apparatus being shown mounted on a palm tree trunk indicated by diagrammatic lines.

Fig. 2 is a top view of the apparatus shown in Fig. 1.

Fig. 3 is a side view of the apparatus shown in Fig. 2 taken in the direction indicated by arrow 3, the main frame of the apparatus being shown only by diagrammatic lines.

Fig. 4 is a vertical sectional view taken through the apparatus shown in Fig. 2 as indicated by the lines IV—IV of Fig. 2.

Fig. 5 is a fragmentary side view of the apparatus shown in Fig. 2, the view being taken in the direction indicated by the arrow 5.

Fig. 6 is a fragmentary enlarged view of the movable bearing block used in connection with regulating the ascent and descent of the apparatus.

Referring particularly to Fig. 1 a palm tree trunk, illustrated by diagrammatic lines, has adjacent its top downwardly turned dead palm leaves or fronds 1. The tree trunk has a diameter which is relatively greater at the bottom than at the top and which may vary throughout the height of the tree.

Encircling the palm tree trunk is a trimming device or apparatus, generally indicated at 2, which is adapted to be expanded or opened outwardly so that it may be placed around the bottom of a tree trunk to be trimmed and then closed as by embracing the tree trunk. The apparatus 2 comprises an expandable and contractible cagelike frame structure including spaced top, bottom and intermediate trunk-encircling segmental members 3, 4 and 5, respectively. Each member 3, 4 and 5 includes a plurality of angle iron arcuate or curved links 6, 7 and 8 pivotally connected at 9 and 10 in series. The outer ends of links 6 and 8 are pivotally connected to resilient straps or bands 11 and 12 respectively. Bands 11 and 12 may be provided with an arcuate portion substantially of the same curvature as links 6, 7 and 8, and may be provided with radially outwardly projecting bent end portions 13 and 14 which are spaced apart in opposed relationship. The bent portions 13 and 14 may be drilled to provide aligned openings through which a connecting rod 15 may pass. The rod 15 is provided at one end with a head 16 having a washer bearing thereagainst to afford a seat for one end of a coil spring 17, the other end of said spring being seated against the portion 13. At its opposite end the connecting rod 15 is provided with an adjusting nut 18 against which a washer bears for providing a seat for an end of a coil spring 19, the opposite end of said spring bearing against the outwardly bent portion 14.

It will thus be apparent that the links 6, 7 and 8 and the bands 11 and 12 are adapted to be opened or unfolded outwardly when the connecting rod 15 is withdrawn from the bands 11 and 12 to enable the cage-like frame structure to be placed around and embrace an associated tree trunk. After the frame members have been placed in encircling position and the connecting rods 15 assembled with bands 11 and 12 for securing the frame members, the adjusting nuts 18 may be tightened an amount necessary to bring the frame members closely adjacent to the tree trunk for placing the coil springs 17 and 19 under compression. Thus a resilient yieldable connection is provided which permits automatic expansion and contraction of said tree encircling members to compensate for variances in trunk diameters.

The top, bottom, and intermediate members 3, 4 and 5, may be connected by spaced vertical strap-like connecting members 20 secured to each frame member by any suitable means such as welding. Also extending between the top, bottom and intermediate frame members may be spaced vertical roller shafts 21, said shafts 21 being secured to the top and bottom frame members in any suitable manner as by welding. Each shaft 21 carries a plurality of segmental freely rotatable rollers 22, one roller 22 being carried between the bottom and intermediate frame member and a pair of rollers 22 being carried between the intermediate and top frame members. The rollers are adapted for rolling contact against the tree trunk when the adjusting nut 18 has been drawn tight enough to place the coil springs 17 and 19 under a desired amount of compression. The trimming apparatus is thus capable of rolling or rotatable movement as a unit around a tree trunk.

At one side of the apparatus 2, the bottom and intermediate frame members may be connected by a vertical generally arcuate plate member 23 provided with an outwardly directed substantially horizontal flange 24 which provides a base or seat for mounting power means generally indicated at 25. The flange 24 may be reinforced by spaced supporting gusset members 26 of generally triangular shape joined as by welding to the plate member 23.

The power means 25 may comprise a small one-cylinder gasoline operated engine of any suitable and well-known make or manufacture. The power means 25 may be provided with a clutch and gear reduction box 27 which is operatively connected to a vertically disposed drive shaft 28 through a chain drive generally indicated at 29 which is adapted to permit slight relative movement of the shaft 28.

Ascent and descent of the device on a tree trunk is afforded by the manner in which the drive shaft 28 is mounted on the cage-like frame structure. The drive shaft 28 may be pivotally mounted at its lower end in a pivotal bearing 30 mounted on the bottom frame member 4. At its upper end the shaft 28 is journaled in a transversely movable bearing block 31 which permits limited angular movement of the drive shaft with respect thereto. The movable bearing block 31 is carried by means for regulating ascent and descent of the device as hereinafter more fully described.

A toothed or knurled drive wheel 32 is mounted adjacent the lower end of the drive shaft between the chain drive 29 and the pivotal bearing block 30. Mounted at the top end of the drive shaft above the movable bearing block is a toothed or knurled drive wheel 33. The wheels 32 and 33 are toothed for the purpose of obtaining traction on the tree trunk as the device moves around the trunk. It is understood that any type of friction material which will afford traction for the drive wheels may be used thereon in place of the toothed wheel illustrated.

The drive shaft 28 is movably spring biased for regulating ascent and descent of the device by means of a rod 34 integrally formed with and projecting from the bearing block 31, and extending tangentially with respect to the top frame member for sliding engagement within a bore provided in a bracket 35 secured in any suitable manner to the top frame member 3. Interposed between the inner face of the bracket 35 and the opposed face of the bearing block 31 may be a coil spring 36 which is normally placed under compression when the apparatus is set for climbing the tree. At the opposite side of the block 31 and integrally formed therewith, a setting ratchet 37 projects in the opposite direction from rod 34 and is provided with upstanding teeth 38 on its upper edge for engagement with a spring-biased trigger 39. The ratchet 37 may be slidably supported in a bracket 40 secured to the top frame member 3.

The trigger 39 may be pivotally supported at 50 by a projection 51 integrally formed with bracket 40, the hub 52 of said trigger enclosing a spring, not shown, which is normally under tension when the shaft 28 is held in climbing position.

The trigger 39 may be provided with a relatively long downwardly and upwardly curved resilient arm 41 which is adapted to bear at its outer downwardly turned end 42 against the lower surface of a dead or downwardly turned palm tree leaf adjacent the trunk of the tree. The arm 41 is curved in such a manner and is of such a length that it may bear against lower surfaces of at least two adjacent palm leaves while permitting some limited vertical movement without disengagement of the trigger 39.

Intermediate its ends the arm 41 is connected to a downwardly depending latch 43 which is provided with an upwardly directed hooked end 44 which extends upwardly a short distance into an eye 45 mounted on the side of the gear box 27. It will be apparent that the trigger 39 engaged in the teeth 38 of the ratchet will hold the spring-biased drive shaft 28 in several selectable angles of inclination which determine the rate of climb of the apparatus.

Cutting means illustrated in the form of a plurality of cutting knives 46 may be weldably secured to a knife carrying ring or curved bar 47 which may be secured to one of the arcuate links, shown as 7, of the top frame member 3. The bar 47 extends only to pivotal points at opposite ends of link 7, and it will be readily understood that as the device expands or contracts the knives are carried radially outwardly or inwardly for conforming with changes in diameter of the trunk. The cutting edge of knives 46 are diagonally disposed and are spaced a sufficient distance above the top frame member so that the dead palm leaves will be severed before the top drive wheel 33 is obstructed by uncut leaves. It will be thus apparent that the leaves are cut and removed from the tree trunk before the drive wheels of the apparatus reach the cutting line of the knives.

In operation, the device may be positioned at the base of a palm tree trunk and opened by removing rod 15 from each of the frame members. The device may then be placed around the tree trunk, and the rods 15 with associated springs reassembled until the rollers 22 contact the face of the tree trunk. The nuts 18 may be tightened until the coil springs 17 and 19 are placed under desired compression so that the device will contract to adjust for diameters of the tree trunk which are smaller than that at the base of the tree. It will be readily apparent that the pivotal connections at 9, 10, and of the bands 11 and 12 with the associated links will readily permit the rollers to readily maintain their contact with the tree trunk.

After the apparatus has been properly reassembled and adjusted, the spring-biased drive shaft may be set at the desired angle of climb by adjustment of the setting ratchet and trigger 39. When the drive shaft is thus positioned for climbing, the coil spring 36 is compressed between the bracket 35 and the movable bearing block 31. After the climbing adjustment has been made as desired, the gasoline engine or power means may be started, the clutch engaged, and power transmitted to the inclined drive shaft 28. Since the drive shaft and wheels are set at an upwardly directed angle, the device will slowly and revolvably turn around the trunk as it ascends the tree.

As the first or lowest dead palm leaves are reached, the end 42 of the trigger arm which extends above the cutting edges of the knives and the top drive wheel, contacts and presses against the leaves and as the device climbs, it is pressed slightly downwardly. This initial contact with the downwardly turned leaves and the resulting downward movement of the trigger arm disengages the hooked end 44 from the eye 45, and thus prepares the trigger arm for release when the arm reaches the point on the tree trunk where it no longers bears against the leaves. As the apparatus continues to climb, the trigger arm 41 is held in downward position by the action of the end 42 against the dead leaves. It will be noted that the length and flexibility of the arm 42 permits the arm to bear against at least two adjacent leaves with some relative vertical movement to prevent releasing of trigger 39 before all the dead leaves are severed. When the device reaches the point on the tree where the dead leaves end and the new leaves are upwardly directed, the end 42 no longer has a downwardly turned dead leaf to bear against, and the spring-biased trigger arm snaps upwardly disengaging the trigger from the ratchet teeth 38. This disengagement permits the movable bearing block 31 to move in the direction of the ratchet by action of the compressed spring 36 until the block engages the bracket 40. It will be apparent that when the block is in engagement with the bracket 40, the drive shaft has been pivoted through a vertical position and is now set for an angle of downward movement, and the apparatus is thus caused to descend. The device slowly and revolvably descends the tree, and when it reaches the bottom of the tree the engine may be manually shut off or if desired, automatic means may be provided which will shut off the ignition of the engine as the device contacts the ground.

While the cutting means are shown as straight upstanding knife elements secured to an arcuate knife carrying bar, other cutting means are contemplated by the invention. For example, the knife elements may be made of roller discs or wheels with cutting edges formed on their circumferences and rotatably journaled on upstanding lugs secured to a knife carrying bar. The roller knives may be spaced slightly above and to the rear of the preceding knife element in order to provide successive cutting of the palm leaves.

As another example, the knife elements may be formed with a wide chisel type cutting edge and mounted on a crank actuable by the driving means and operable with a vertical up and down reciprocating motion for cutting off the leaves as by a chiseling action.

It will thus be apparent that the novel ambulatory tree trimming device described above is readily adapted for use on palm tree trunks of various diameters because of the adjustability of the trunk encircling cage-like frame structure afforded by the yielding and resilient frame member connections. It will also be apparent that after the device is properly positioned and started, further attention need not be directed to the device, since it will slowly climb the tree to the desired point, and automatically begin its descent. When it reaches the bottom of the tree, the engine may be shut off by the operator or by automatic means. Such a tree trimming device will remove downwardly turned leaves from tall slender palm trees which otherwise would not be manually trimmed because of the danger to a person climbing the tree by ordinary means.

It is to be understood that the above description is illustrative only and that other modifications of the device shown may be made without departing from the scope of this invention which is to be limited only by the scope of the appended claims.

I claim:

1. A self-contained power operated palm tree trimming device comprising: a cage frame selectively positionable around the trunk of a palm tree; cutting means carried by the cage frame for cutting dead palm fronds; means for driving said cage frame along a spiral path upwardly along the trunk; automatically releasable means for varying the angle of the spiral path to lower the cage frame; and said last-named means including a trigger means operable by difference in inclination of palm fronds encountered by the device.

2. An apparatus for trimming downwardly turned palm leaves from a palm tree trunk comprising: an expandable and contractible cage-like structure having a plurality of spaced trunk encircling members, each including pivotally connected curved links in series adapted to partially encircle a tree trunk and joined by a yieldably resilient connection; a plurality of spaced vertical shaft members connecting said frame members and carrying segmental rotatable rollers adapted for rolling contact with the tree trunk;

cutting means carried by the top frame member and extending upwardly therefrom for severing downwardly turned palm leaves; power means supported on said structure adjacent the bottom; driving means operatively connected to said power means, said driving means having a pivotal bearing support at one end and a transversely movable bearing support adjacent its other end whereby said drive means is permitted limited movement in opposite directions about its vertical axis; means for adjustably and selectively positioning said drive means for regulating the angle of climb of said apparatus; means for automatically releasing said positioning means for terminating climbing of said apparatus and causing descent thereof including a trigger arm adapted to bear against downwardly turned leaves while ascending the tree and spring biased for release of said positioning means; said knives having their cutting edges spaced above said top frame member a distance such that the downwardly turned leaves will be severed before the driving means travels over the point to which the leaves are attached to the tree trunk.

3. An apparatus for trimming downwardly turned palm leaves from a palm tree trunk comprising: an expandable and contractible cage-like structure having a plurality of spaced trunk encircling members, each including pivotally connected curved links in series adapted to partially encircle a tree trunk and joined by a yieldably resilient connection; a plurality of spaced vertical shaft members connecting said frame members and carrying segmental rotatable rollers adapted for rolling contact with the tree trunk; cutting means carried by the top frame member and extending upwardly therefrom for severing downwardly turned palm leaves; power means supported on said structure adjacent the bottom; driving means operatively connected to said power means, said driving means having a pivotal bearing support at one end and a transversely movable bearing support adjacent its other end whereby said drive means is permitted limited movement in opposite directions about its vertical axis; means for adjustably and selectively positioning said drive means for regulating the angle of climb of said apparatus; and means for automatically releasing said positioning means for terminating climbing of said apparatus and causing descent thereof including a trigger arm adapted to bear against downwardly turned leaves while ascending the tree and spring-biased for release of said positioning means.

4. An apparatus for trimming downwardly turned palm leaves from a palm tree trunk comprising: an expandable and contractible cage-like structure having a plurality of spaced trunk encircling members, each including pivotally connected curved links in series adapted to partially encircle a tree trunk and joined by a yieldably resilient connection; a plurality of spaced vertical shaft members connecting said frame members and carrying segmental rotatable rollers adapted for rolling contact with the tree trunk; cutting means carried by the top frame member and extending upwardly therefrom for severing downwardly turned palm leaves; power means supported on said structure adjacent the bottom; driving means operatively connected to said power means, said driving means having a pivotal bearing support at one end and a transversely movable bearing support adjacent its other end whereby said drive means is permitted limited movement in opposite directions about its vertical axis; means for adjustably and selectively positioning said drive means for regulating the angle of climb of said apparatus; and means for automatically releasing said positioning means for terminating climbing of said apparatus and causing descent thereof.

5. A tree trimming device for removing downwardly turned palm leaves from a palm tree trunk comprising: an adjustable, expandable and contractible cage-like frame structure adapted to yieldably encircle the trunk for climbing engagement therewith; upstanding cutting elements mounted on said structure and adapted to sever the downwardly turned leaves as the device turns around and simultaneously climbs the tree trunk; and driving means carried by said structure including selectively positionable spring-biased pivotally mounted means adapted to regulate the angle of climb of said device and automatically releasable for descent of said device when downwardly turned leaves have been severed from the tree trunk.

6. In a tree trimming device for removing palm leaves from a palm tree trunk the combination of: a resiliently expandable and contractible cage frame adapted to encircle a trunk for spiral climbing engagement therewith; cutting elements carried by said cage frame arranged to sever the palm leaves adjacent the trunk; and driving means carried by the cage frame including vertically spaced traction means and a vertical connecting shaft, one end of said shaft being pivotally mounted to incline the shaft from the vertical, said traction means and shaft being positionable to regulate the spiral path of the device during ascent and descent of the device along the trunk.

7. A device for trimming dead palm fronds from a palm tree comprising: an adjustable cage frame adapted to encircle the trunk of a palm tree; spring means for yieldably constricting the cage frame around the trunk; anti-friction means carried by the cage frame for contact with the trunk whereby said cage frame may rotate around the trunk; traction means carried by the cage frame in vertically spaced driving engagement with the trunk; motor means carried by the frame for driving the traction means; cutting means on said cage frame for cutting dead palm fronds; means for controlling a spiral rate of climb of said cage frame; and means cooperable with said traction means and actuated by difference in inclination of palm fronds encountered by the device to cause descent of said cage frame.

8. A self-contained power operated palm tree trimming device comprising: a cage frame selectively positionable around the trunk of a palm tree; cutting means carried by the cage frame for cutting dead palm fronds; driving means carried by the cage frame for moving said cage frame in a spiral path upwardly along the trunk; and means cooperable with said driving means and operable by difference in inclination of palm fronds encountered by the device to cause descent of the cage frame.

9. A self-contained power operated palm tree trimming device comprising: a cage frame selectively positionable around the trunk of a palm tree; cutting means carried by the cage frame for cutting dead palm fronds; and driving means carried by the cage frame for moving said cage frame in a spiral path upwardly along the trunk, said driving means including a traction assembly having spaced vertically arranged trunk engaging traction means pivoted at one end and adjustable to vary the spiral path of the cage frame along the trunk.

10. In a tree trimming device for removing palm leaves from a palm tree trunk the combination of: a resiliently expandable and contractible cage frame adapted to encircle a trunk for spiral climbing engagement therewith; cutting elements carried by said cage frame arranged to sever the palm leaves adjacent the trunk; and driving means carried by the cage frame including spring biased, pivotally mounted means positionable to regulate the rate of spiral movement of the device and releasable for descent of the device; and trigger means cooperable with the pivotally mounted means for release of the pivotally mounted means.

11. In a tree trimming device for removing palm leaves from a palm tree trunk the combination of: a resiliently expandable and contractible cage frame adapted to encircle a trunk for spiral climbing engagement therewith; cutting elements carried by said cage frame arranged to sever the palm leaves adjacent the trunk; and driving means carried by the cage frame including spring biased, pivotally mounted means positionable to regulate the rate of spiral movement of the device and releasable for descent of the device; and automatically releasable means cooperable with the positionable means for terminating climbing of the device and causing descent thereof.

12. In a tree trimming device for removing palm leaves from a palm tree trunk the combination of: a resiliently expandable and contractible cage frame adapted to encircle a trunk for spiral climbing engagement therewith; cutting elements carried by said cage frame arranged to sever the palm leaves adjacent the trunk; and driving means carried by the cage frame including spring biased, pivotally mounted means positionable to regulate the rate of spiral movement of the device and releasable for descent of the device; said cutting elements being disposed in spaced relation with cutting edges progressively increasing in height above the cage frame.

WILLIS E. LLEWELLYN.

REFERENCES CITED

The following references are of record in the file of this patent:

UNITED STATES PATENTS

| Number | Name | Date |
|---|---|---|
| 2,477,922 | Emery | Aug. 2, 1949 |
| 2,482,392 | Whitaker | Sept. 20, 1949 |

FOREIGN PATENTS

| Number | Country | Date |
|---|---|---|
| 233,629 | Switzerland | Nov. 1, 1944 |